United States Patent [19]

Lambrecht et al.

[11] 4,079,273
[45] Mar. 14, 1978

[54] COOLANT CIRCUIT FOR THE ROTOR OF AN ELECTRIC MACHINE HAVING A SUPERCONDUCTIVE EXCITATION WINDING

[75] Inventors: Dietrich Lambrecht; Erich Weghaupt, both of Mulheim an der Ruhr, Germany

[73] Assignee: Kraftwerk Union Aktiengesellschaft, Mulheim an der Ruhr, Germany

[21] Appl. No.: 679,740

[22] Filed: Apr. 23, 1976

[30] Foreign Application Priority Data

Apr. 23, 1975 Germany .............................. 2518062

[51] Int. Cl.² .............................................. H02K 9/00
[52] U.S. Cl. ....................................... 310/52; 310/64; 62/55; 62/505
[58] Field of Search ........................ 310/64, 52, 54, 40, 310/10, 53, 61; 62/55, 505

[56] References Cited

U.S. PATENT DOCUMENTS

| 2,970,232 | 1/1961 | Kilbourne | 310/53 |
| 3,149,478 | 9/1964 | Anderson | 62/505 |
| 3,626,717 | 12/1971 | Lorch | 62/505 |
| 3,648,082 | 3/1972 | MacNab | 310/10 |
| 3,657,580 | 4/1972 | Doyle | 310/10 |
| 3,679,920 | 7/1972 | MacNab | 310/10 |
| 3,823,569 | 7/1974 | Sellmaier | 62/55 |
| 3,845,639 | 11/1974 | Smith | 62/505 |
| 3,904,901 | 9/1975 | Renard | 310/54 |
| 3,991,588 | 11/1976 | Laskaris | 62/505 |

*Primary Examiner*—R. Skudy
*Attorney, Agent, or Firm*—Herbert L. Lerner

[57] ABSTRACT

In a coolant circuit for an electric machine rotor mounted on a shaft and having a superconductive excitation winding, a cold shield with a damping winding surrounding the excitation winding, as well as a coolant connecting head surrounding one end of the shaft at the excitation winding side thereof, a device for feeding coolant from a refrigerating machine through the coolant connecting head to an axial bore formed in the rotor shaft and from the axial bore to a collection chamber surrounding the shaft, coolant channels for the excitation winding disposed in the rotor, a cold shield with a damping winding surrounding the coolant channel in the rotor, a coolant outlet channel in the shaft communicating with the collection chamber, the coolant channels and the damping winding being connected to one another and connecting the axial bore formed in the rotor shaft to the coolant outlet channel, and a throttling member in the coolant outlet channel for reducing coolant outlet pressure.

2 Claims, 1 Drawing Figure

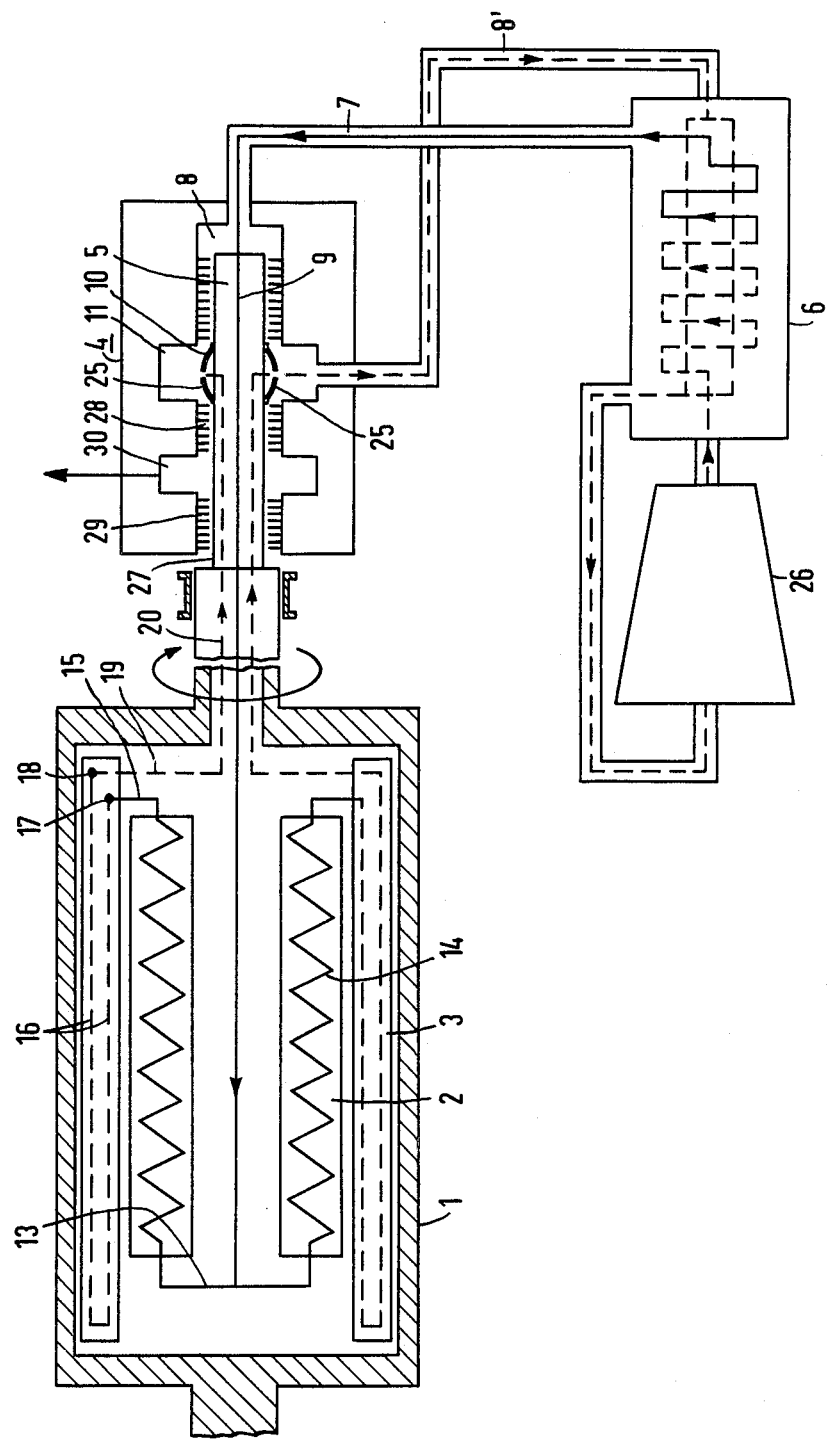

COOLANT CIRCUIT FOR THE ROTOR OF AN ELECTRIC MACHINE HAVING A SUPERCONDUCTIVE EXCITATION WINDING

The invention relates to a coolant circuit for the rotor of an electric machine, such as a turbogenerator, especially, having a superconductive excitation winding. More specifically, the invention relates to such a coolant circuit which includes a cold shield wit a damping winding surrounding the superconductive excitation winding, as well as a coolant connecting head which surrounds the rotor shaft end located at the excitation-winding side and through which coolant flowing from a refrigerating machine or cryostat is fed to an axial bore formed in the rotor shaft and again discharged from the shaft through a collection chamber surrounding the shaft.

Such a coolant circuit has become known heretofore from German Published Non-Prosecuted Application DT-OS 2 028 158 wherein part of the coolant compressed and liquefied outside the rotor can be branched off inside the rotor and employed for cooling a shielding surrounding the excitation winding. The helium feed lines to the rotating rotor shaft and the helium discharge lines from the rotating rotor shaft, as well as the disposition of many helium feed and discharge channels within the rotor cause considerable difficulties, and raise a series of sealing problems.

In this regard, it has also been suggested heretofore to connect the cooling channels of the radially inwardly disposed excitation winding and the cooling channels of the radially outwardly disposed cold shield in series with respect to one another and to let the same coolant flow therethrough sequentially, so that optimal cooling is effected.

Due to this serial connection of the cooling channels of the excitation winding and of the cold shield and due to the radial location of the cold shield, the rotor produces, in fact, a high inherent or automatic feed pressure so that, in itself, the compressor power of the refrigerating machine or cryostat can be economized. On the other hand, additional sealing problems are produced with respect to the shaft at the excitation-machine end thereof in the coolant connecting head because of the high outlet pressure of the coolant.

It is accordingly an object of the invnetion to provide a coolant circuit for the rotor of an electric machine having a superconductive excitation winding which largely avoids the aforementioned difficult sealing problems in the coolant connecting head while maintaining optimal cooling of the excitation winding and of the cold shield.

With the foregoing and other objects in view, there is provided, in accordance with the invention, in a coolant circuit for an electric machine rotor mounted on a shaft and having a superconductive excitation winding, a cold shield with a damping winding surrounding the excitation winding, as well as a coolant connecting head surrounding one end of the shaft at the excitation winding side thereof, means for feeding coolant from a refrigerating machine through the coolant connecting head to an axial bore formed in the rotor shaft and from the axial bore to a collection chamber surrounding the shaft, coolant channels for the excitation winding disposed in the rotor, a cold shield with a damping winding surrounding the coolant channels in the rotor, a coolant outlet channel in the shaft communicating with the collection chamber, the coolant channels and the damping winding being connected to one another and connecting the axial bore formed in the rotor shaft to the coolant outlet channel, and throttling means in the coolant outlet channel for reducing coolant outlet pressure.

In accordance with another feature of the invention, the throttling means are constructed so as to maintain coolant inlet pressure in the axial bore formed in the rotor shaft at a higher level than the outlet pressure in the coolant collecting chamber, and the pressure in the coolant collecting chamber at a level higher than outer atmospheric pressure.

In accordance with a further feature of the invention, the coolant circuit includes a plurality of seals between the rotor shaft and the coolant connecting head, all of the seals being constructed as non-contacting split bushings.

In accordance with an alternate feature of the invention, the coolant circuit includes a plurality of seals between the rotor shaft and the coolant connecting head, all of the seals being constructed as non-contacting comb rings.

Other features which are considered as characteristic for the invention are set forth in the appended claims.

Although the invention is illustrated and described herein as embodied in coolant circuit for rotor of an electric machine having a superconductive excitation winding, it is nevertheless not intended to be limited to the details shown, since various modifications and structural changes may be made therein without departing from the spirit of the invention and within the scope and range of equivalents of the claims.

The construction and method of the invention, however, together with additional objects and advantages thereof will be best understood from the following description of specific embodiments when read in connection with the single FIGURE of the drawing which is a schematic view of a coolant circuit for a rotor of an electric machine having a superconductive excitation winding.

Referring now to the FIGURE of the drawing, there is shown therein a vacuum-tight drum rotor 1 having in the interior thereof a superconductive excitation winding 2 and a cold shield 3 disposed coaxially thereto with a damping winding. The rotor shaft end 5 on the excitation coil side is enclosed by a coolant connecting head 4 through which helium, which is employed as the coolant, is fed to the rotor shaft. The coolant travels from a cryogenically cooling refrigerating machine or cryostat 6 through a line 7 into a coolant feeding chamber 8 of the coolant connecting head 4 and from there into an axial bore 9 formed in the rotor shaft 5. At a location 13, liquid helium flows into parallel cooling channels 14 of the superconductive excitation winding 2 and then through radial connecting lines 15 to a connecting location 17 of a cooling channel 16 of the cold shield 3. The liquid helium transforms to the gaseous state within the cooling channel 16 and is fed from the outlet location 18 through radial channels 19 to an annular channel 20 formed in the excitation winding end 5 of the rotor shaft, from which it flows through radial outlet channels 10 into a coolant collecting chamber 11 of the stationary coolant connecting head 4.

Due to the radial location of the cold shield 3, the coolant pressure is increased to about 20 bar because of the radial spacing of the outlet point 18 at the cold shield 3 and the outlet point 10 at the rotor shaft end 5, as well as because of the difference in the density of the coolant between both those points 10 and 18. The coolant pressure of about 20 bar would then also prevail in the coolant collecting chamber 11 which would signify serious sealing problems for the coolant connecting head 4 if it were not for the fact that throttles 25, in the form of ring diaphragms or orifices, were disposed, for this reason, at the outlet 10 for the coolant, which reduce the coolant pressure in the coolant collecting chamber 11 to about 1.2 to 1.3 bar. The result thereof is that, for the circulatory process of the refrigeration machine or cryostat 6, the required high pressure must then again be produced by an auxiliary gas compressor 26. The latter compresses the coolant flowing through the line 8' out of the coolant collecting chamber 11, and conducts the coolant to the cryostat 6 proper for re-liquefying the same, the re-liquefied coolant being then fed from the refrigeration machine 6 through the line 7 to the exciter end 5 of the rotor shaft.

Through this throttling of the outlet pressure of the coolant, considerable advantages for shaft seals are provided for the coolant connecting head 4. Because of the slight pressure difference of only about 0.1 to 0.2 bar excess pressure between the coolant collecting chamber 11 and the coolant feed chamber 8, as well as the outer atmosphere at a shaft passageway 27, simple fixed bushings or rings of the contactless type i.e. which have a slight clearance between the inner periphery thereof and the shaft 5, or labyrinth rings 28 and 29 serve adequately for shaft sealing. They have the advantage of being insensitive to axial shaft displacement and, within limits, to radial oscillations or vibrations. In this regard, any helium leakage that may occur at the bushing or ring 28, together with any air introduced through the bushing or ring 29 can be sucked out of an exhaust chamber 30 with a non-illustrated suction blower, and the helium can then be separated from the air and fed back into the helium circuit.

There is claimed:

1. In a coolant circuit for an electric machine rotor mounted on a shaft and having a superconductive excitation winding, a cold shield with a damping winding surrounding the excitation winding, as well as a stationary coolant connecting head surrounding one end of the shaft at the excitation winding side thereof, said stationary coolant connecting head being formed with a collection chamber surrounding said one end of the shaft, means for feeding coolant from a refrigerating machine through the coolant connecting head to an axial bore formed in the rotor shaft and from the axial bore to said collection chamber surrounding the shaft, coolant channels for the excitation winding disposed in the rotor, a cold shield with a damping winding surrounding said coolant channels in the rotor, a coolant outlet channel disposed in the shaft and having an end thereof communicating with said collection chamber, said coolant channels and said damping winding being connected to one another and connecting said axial bore formed in the rotor shaft to said coolant channel, and throttling means mounted on the rotor shaft proper at said end of said coolant outlet channel for reducing pressure of the coolant discharging from said end of said coolant outlet channel into said collection chamber formed in said stationary coolant connecting head.

2. Coolant circuit according to claim 1 wherein said throttling means are constructed so as to maintain coolant inlet pressure in said axial bore formed in the rotor shaft at a higher level than the outlet pressure in said coolant collecting chamber, and the pressure in said coolant collecting chamber at a level higher than outer atmospheric pressure.

* * * * *